P. K. DEDERICK.
Hay and Cotton Press.
No. 7,982. Reissued Dec. 11, 1877.
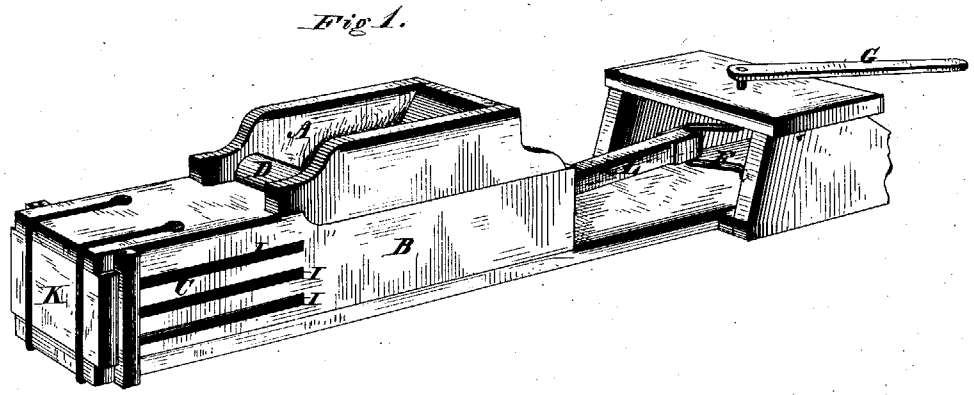
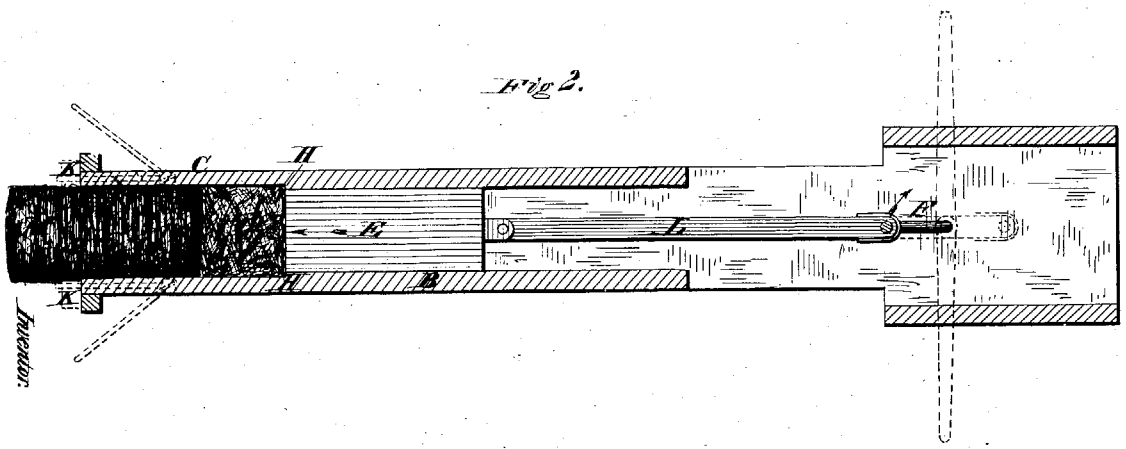
*Witnesses.*
Harry King
Frank McKenny.
*Inventor.*
Peter K. Dederick
By Hill & Ellsworth
His attys.

UNITED STATES PATENT OFFICE.

PETER K. DEDERICK, OF ALBANY, NEW YORK.

IMPROVEMENT IN HAY AND COTTON PRESSES.

Specification forming part of Letters Patent No. 132,566, dated October 29, 1872; Reissue No. 7,982, dated December 11, 1877; application filed July 27, 1877.

DIVISION B.

*To all whom it may concern:*

Be it known that I, PETER K. DEDERICK, of the city of Albany, county of Albany and State of New York, have invented new and useful Improvements in Baling-Presses, of which the following is a specification:

Figure 1 is a perspective view, showing the machine completed and in position for operation, and Fig. 2 is a top view, showing my improvements and their connections and the manner of operation.

In the figures, A is the hopper for receiving the loose material. B is the press-box, into which the loose hay is received and pressed. C is the bale-chamber, into which the hay is deposited after pressing. D is a roller to assist in guiding the hay into the press-box. E is the traverser. F is a crank, forming a toggle in connection with the pitman L.

This arrangement would also operate another press of similar construction at the opposite side of the crank, and without expense of power, thus constituting a double machine operated by a common power, the pressing being done alternately. G is the sweep, to which the horses are attached.

The power may be applied in a variety of ways. The bale, when formed in the bale-chamber C, is tied or bound through the slots I in the box, as shown in Fig. 1, and is removed or forced out of the end of the press at K, by the pressure exerted by the traverser in building up the next bale, as shown, C′ being the forming bale, and M the finished bale.

The distance between the head of the press and the traverser, when nearest the head, or, in other words, the distance between the retainers that prevent the hay from expanding and the head may be greater than the dimensions of the bale-chamber any other way, thus forming the length of the bale toward the traverser or point of filling, and as the expansion is always in the same direction, toward the traverser or power, it will be proportionately less as the ends are smaller.

In operation the horses are attached to the sweep or lever G; the hay or other material to be pressed is pitched into the hopper A, whence it falls into the press-box B, and is forced into the bale-chamber C by the traverser E. Meantime the hopper A is again filled, the traverser or an equivalent slide attached, forming the bottom, which is withdrawn by the revolutions of the crank, in connection with the pitman, and the loose hay, of its own gravity, falls from the hopper into the press-box. This is continued until the bale-chamber is pressed full, when the bale may be tied off, and the end door opened. This bale, however, will be rough, in consequence of having nothing compact to commence the bale against.

The operation now changes, and the pressing, instead of being performed in the bale-chamber C, is completed, or nearly so, in the press-box B, and the compressed sections forced into the bale-chamber, where they are retained by the retaining-shoulders H, and the finished bale ejected as fast as the compressed sections are forced behind it within the chamber, and the bale finished against the door, which is closed after the bale is removed, thus building up the bale in pressed sections, piled one against another endwise; and the operation is thus continued, the first bale only being roughly put up.

The subject-matter of the claims in this case is substantially shown in my patent, No. 132,639, dated October 29, 1872, and in an application for a reissue of the same, but is not there claimed.

Having thus described my invention, I claim as follows:

1. The press-box B and hopper A, provided with a movable bottom, in combination with the pitman and crank or toggle L F, substantially for the purpose set forth.

2. The combination of the sweep or horse-lever with the crank F and pitman L, for operating the traverser of a baling-press.

3. The crank F, pitman L, and traverser E, in combination with the baling-chamber B C and tying-slots I.

4. The combination of the crank F, pitman L, and traverser E with the baling-case B C and end door K, as set forth.

PETER K. DEDERICK.

Witnesses:
W. A. SKINKLE,
C. R. DEDERICK.